United States Patent [19]

Konoeda et al.

[11] Patent Number: 5,214,998
[45] Date of Patent: Jun. 1, 1993

[54] AROMA CAPTURING APPARATUS

[75] Inventors: Saburo Konoeda; Hiroki Yamamoto, both of Tokyo, Japan

[73] Assignee: Nagaoka Perfumery Co., Ltd., Japan

[21] Appl. No.: 827,077

[22] Filed: Jan. 28, 1992

[30] Foreign Application Priority Data

Jan. 29, 1991 [JP] Japan .................. 3-009299

[51] Int. Cl.$^5$ .................. A23L 3/00; A47J 31/42; A61L 9/00
[52] U.S. Cl. .................. 99/275; 99/474; 99/476; 99/483; 99/485; 99/495; 99/534
[58] Field of Search .............. 99/275, 283, 287, 323.3, 99/357, 444, 467, 469, 472, 473–476, 482, 483, 484, 485, 495, 496, 516, 534, 537; 426/474, 475, 387, 594; 261/18.1, DIG. 65, DIG. 26; 55/84, 87

[56] References Cited

U.S. PATENT DOCUMENTS

| | | | |
|---|---|---|---|
| 3,727,640 | 4/1973 | Sargeant | 99/275 |
| 4,004,035 | 1/1977 | Hirzel et al. | 426/275 |
| 4,072,761 | 2/1978 | Margolis et al. | 261/DIG. 26 |
| 4,204,464 | 5/1980 | Strobel | 99/483 |
| 4,276,243 | 6/1981 | Partus | 261/DIG. 65 |
| 4,355,571 | 10/1982 | Stoeckli et al. | 99/485 |
| 4,439,459 | 3/1984 | Swartley | 426/474 |
| 4,465,697 | 8/1984 | Brice et al. | 99/287 |
| 4,581,989 | 4/1986 | Swartley | 99/346 |
| 4,699,794 | 10/1987 | Brice et al. | 99/287 |
| 4,732,080 | 3/1988 | Vita | 99/330 |
| 4,825,757 | 5/1989 | Stoner | 99/279 |

*Primary Examiner*—Timothy F. Simone
*Attorney, Agent, or Firm*—Ladas & Parry

[57] ABSTRACT

A food material which is hermetically accommodated in a heating unit is heated and a generated aroma component is delivered by a carrier gas supply unit together with a carrier gas through connection pipe to an aroma component dissolving and capturing unit including a hermetically sealed container in which an aroma dissolving solution is stored.

6 Claims, 1 Drawing Sheet

AROMA CAPTURING APPARATUS

BACKGROUND OF THE INVENTION

This invention relates to an apparatus for and a method of capturing aroma, particularly aroma of food materials generated by effecting a heat treatment such as roasting to them.

In a known art, an aroma component generated by roast heating beans, for example, is extracted in a manner of using a solvent such as organic solvent, water, heated, water, steam or the like, which directly contacts the beans, the aroma component is subjected to extraction or oil pressing treatment under physical treatment such as pressurization, pressure reduction, heat application or the like, and then the aroma component is collected by a refining process including filtering process or distillation process. The thus collected aroma component is utilized as a product of food perfume. Such technology is, for example, disclosed in japanese Patent Laid-open Publication No. 2-203750 (203750/1990).

However, in this prior art aroma collecting technology, an off-flavor, caramel odor, for example, generated by the roast treatment is together extracted, and hence, it is difficult to selectively extract only the desired aroma component.

SUMMARY OF THE INVENTION

An object of this invention is to substantially and to provide apparatus for and a method of capturing aroma capable of selectively extracting an aroma component without extracting any other undesired odor component and effectively capturing the extracted aroma component.

This and other objects can be achieved according to this invention by providing, in one aspect, an apparatus for capturing an aroma component generated from an aroma source, the apparatus comprising a heating unit in which the aroma source is accommodated and which heats the aroma source to thereby generate the aroma component, a gas supply unit for supplying a carrier gas and delivering the aroma component generated in the heating unit together with the carrier gas and an aroma capture unit for capturing the aroma component.

In a preferred embodiment, the heating unit is provided with a cylindrical container in which the aroma source is accommodated and a heating means for heating the aroma source to generate the aroma component, the gas supply unit includes a gas supply source supplying the carrier gas for carrying together with the aroma component from the heating unit, and the aroma capture unit is provided with an aroma capturing container in which aroma component dissolving solution is stored.

In another aspect, there is provided a method of capturing an aroma component generated from an aroma source, the method comprising the steps of heating the aroma source to generate the aroma component, supplying a carrier gas to deliver the aroma component together with the carrier gas and capturing the aroma component delivered with the carrier gas.

In both aspects, in a preferred embodiment, the carrier gas is an insert gas such as nitrogen, argon, helium or carbonic acid gas, or air, oxygen, hydrogen gas, or an active gas such as carbon monoxide gas. The aroma component is captured by passing the aroma component together with the carrier gas through an aroma component dissolving solution. The aroma component dissolving solution is any one of glycerol, propylene glycol, ethanol, methanol, glycerol fatty acid ester, hexane, acetone, vegetable oil, animal oil, water, sugar alcohol or saccharides solution, or solution of mixture of some of them. The temperature of the aroma component dissolving solution is within a range of $-40°$ to $60°$ C.

According to this invention of the characters described above, aroma source such as food material is heated to thereby generate an aroma component. The generated aroma component is carried out through the gas supply unit together with the carrier gas and then dissolved in the aroma component dissolving solution and captured therein. According to such a process, the aroma component is effectively captured and recovered without capturing any other undesired aroma component. The thus obtained aroma substance is superior in its flavor in comparison with a conventional flavor.

BRIEF DESCRIPTION OF THE DRAWING

In a single accompanying drawing.

DESCRIPTION OF THE PREFERRED EMBODIMENT

Figure 1:
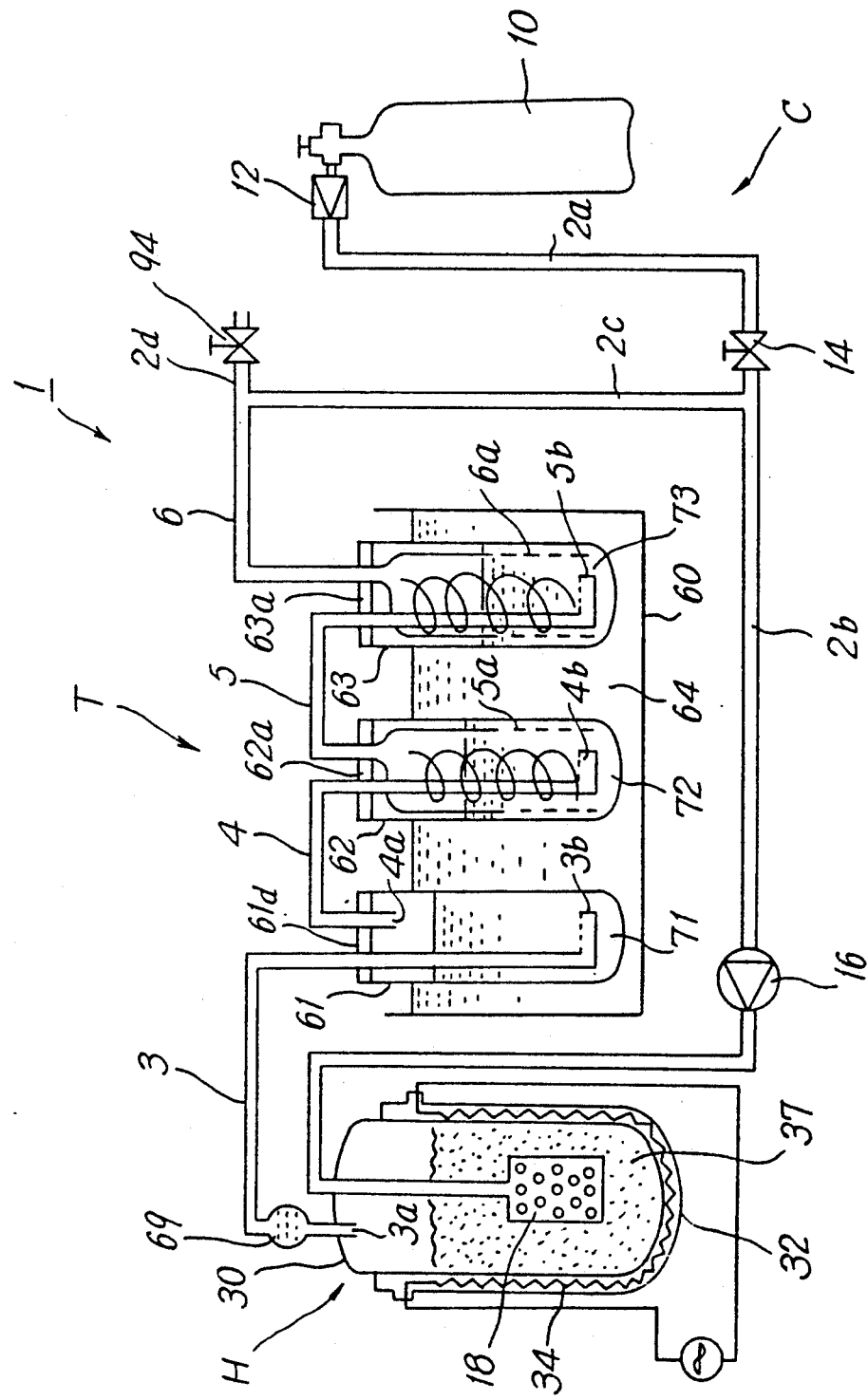
FIG. 1 shows a schematic view of an aroma capturing apparatus according to this invention.

Referring to FIG. 1, an aroma capturing apparatus 1 is composed of a heating unit H including a container in which a food material as an aroma source is contained, and generating an aroma component by heating the food material, a gas supply unit C for supplying a supply gas as a carrier gas and delivering the aroma component generated in the heating unit H together with the carrier gas, and an aroma capture unit T for dissolving the delivered aroma component and capturing the same.

The heating unit H comprises a cylindrical column 30 for accommodating the food material 37 as the aroma source, a heating jacket 32 arranged so as to surround an outer peripheral surface of the column 30 and a heater 34 disposed inside the heating jacket 32. As the food material 37 for generating the aroma component by the heat treatment such as roast treatment, will be desired coffee beans, cacao beans, roasted beans, Japanese rice crackers, barbecured eels, baked fishes such as saury, beef steaks, tea leaves, barley tea leaves, baked garlic, onions, leeks, baked sweet potatoes, corns and the like. Usually, these food materials are contained in the column 30 after the grinding operation into powder-like materials for increasing surface area contacting the aroma dissolving solution. The column 30 is usually formed as a sealed structure provided with an inlet and outlet for an aroma carrier gas. Various kinds of heating means may be substituted for the heater 34.

The gas supply unit C mainly acts to deliver the aroma component generated by the heating unit H together with the carrier gas to the aroma capture unit T. The gas supply unit C comprises a gas bomb (or cylinder) 10 as a gas supply source, a diffuser pipe 18 embedded in the food material 37, and a pipe line including pipes 2a and 2b. The diffuser pipe 18 is provided with a plurality of holes for distributing the carrier gas. A primary valve 12 in form of a pressure reduction valve, an inlet valve 14 and a gas circulation pump 16 are incorporated or mounted on the pipe line 2a, 2b as occasion demands.

When the gas circulation pump 16 is operated, the carrier gas is fed into the column 30 of the heating unit H. As such carrier gas is utilized an inert gas such as nitrogen, argon, helium or carbonic acid gas, or air, oxygen, hydrogen gas, or an active gas such as carbon monoxide gas, and it is more preferable to utilize the inert gas such as nitrogen or carbonic acid gas. The gas supply unit C is also constructed as a sealed system. The pipe line 2b is connected through a pipe 2c to a pipe 2d to which a connection pipe 6 is further connected as described hereinafter, thus constituting a gas circulation passage or loop.

The aroma capture unit T includes first, second and third bottomed cylindrical aroma capturing containers 61, 62 and 63, which are communicated in series through connection pipe means 3, 4 and 5, respectively, and in which aroma dissolving and capturing solutions 71, 72 and 73 are contained, respectively. These aroma capturing containers 61, 62 and 63 have upper openings sealed hermetically by lids 61a, 62a, and 63a, respectively. That is, the column 30 of the heating unit H is communicated hermetically with the first, second and third, in this order, aroma capturing containers 61, 62 and 63 through the connection pipe 3, 4 and 5, respectively, so that the aroma delivered together with the carrier gas is dissolved and captured by the aroma dissolving and capturing solutions 71, 72 and 73 stored in the respective aroma capturing containers 61, 62 and 63. In detail, the connection pipe 3 has an upstream side end 3a extends into the upper portion of the column 30 and a downstream side end 3b extends in the bottom portion of the first aroma capturing container 61. A filter means 69 may be disposed on slightly upstream side of the end portion 3a of the connection pipe 3 as occasion demands. In the like manner, the connection pipes 4 and 5 are arranged, and the connection pipe 6, in final stage, has an upstream side end 6a extends into the third aroma capturing container 63 and another end connected to the pipe 2d to which an outlet valve 94 is mounted. In a preferred embodiment, the upstream side ends 5a and 6a of the connection pipes 5 and 6 are expanded widely and immersed in the aroma dissolving and capturing solutions 72 and 73 for easily capturing the gas including the aroma not dissolved, as shown in the drawing with dotted lines.

As the aroma dissolving and capturing solutions 71, 72 and 73 are used glycerol, propylene glycol, ethanol, methanol, glycerol fatty acid ester, hexane, acetone, vegetable oil, animal oil, water, sugar alcohol or saccharides solution, or solution of mixture of some of them, which will be selectively utilized in accordance with the food materials to be treated with. According to the preferred embodiment of the present invention, the temperature of the aroma dissolving and capturing solutions are desired to be within a range of −40° to 60° C., preferably −5° to 20° C., and more preferably 5° to 15° C. In case of the temperature below −40° C., a viscosity of the solution may adversely increase or the solution may solidify, and in case of the temperature over 60° C., the captured aroma may be diverged, thus being inconvenient.

The number of the aroma dissolving and capturing containers may be increased or decreased in accordance with the solubility of the aroma component and the aroma residence time in the solutions, and accordingly, the number is not limited to three as described in the present embodiment.

The aroma capturing apparatus according to the present invention of the structure described above will operates in the following manner.

The food material subjected to the heat treatment such as roasting treatment is supplied in the column 30 of the heating unit H and the column 30 is then sealed. The aroma dissolving and capturing solutions were filled up in the aroma capturing containers, which are then maintained as they are at a predetermined cooled temperature. Gas, generally air, filling the inside of the whole apparatus is then substituted with the carrier gas through the gas circulation loop in a manner that the inlet valve 14 and the outlet valve 94 are opened and the carrier gas is preliminarily fed for several minutes from the carrier gas bomb 10. After the gas substitution has been completed, the inlet valve 14 is closed.

Under these conditions, the column 30 is heated by the heater 34 to increase the inside temperature of the column 30 to a predetermined value, and when the heated gas is distributed throughout the apparatus through the connection pipes, the temperature therein reaches the predetermined value and the expansion of the gas due to the heating is ceased, the outlet valve 94 is closed. At this time, the gas circulation pump 16 is driven for forcibly circulate the carrier gas in the apparatus through the respective units, H, T and C to thereby realize the gas circulation with a predetermined gas flow speed. This forcible gas circulation is continuously carried out till the aroma component to be substantially almost captured is generated through the diffuser pipe 18. When the aroma component has substantially completely captured and recovered, the food material stored in the column 30 may be exchanged with new food material through a batch operation, for example, and the subsequent aroma component capturing operation may be carried out. Otherwise, the aroma capturing containers 61, 62 and 63 are disassembled and the aroma component capturing process has been finished. A further process for concentrating the recovered aroma component or for separation of the aroma component in accordance with conventional technology may be added as occasion demands.

The present invention will be described further in detail with reference to the following experimental examples.

EXPERIMENTAL EXAMPLE 1

In the utilization of the aroma capturing apparatus shown in FIG. 1, a food material of coffee beans of 300 g subjected to the heat treatment such as roasting treatment was supplied in a column 30 having an inner volume of 1000 ml, which was then sealed. An aroma capturing solution of 300 g consisting of mixed glycerol and ethanol having volume ratio of 1:1 was filled up in the aroma capturing containers 61, 62 and 63, each having an inner volume of 500 ml, and the containers were maintained with the cooled temperature of 8° to 15° C.

Under this condition, the inlet valve 14 and the outlet valve 94 were opened, The nitrogen gas contained in the nitrogen gas bomb was fed at a flow rate of 3000 ml/min. for about two minutes to substitute the gas in the apparatus with the nitrogen gas as a carrier gas. After the completion of the substitution, the inlet valve 14 was closed.

Next, the column 30 was heated by the heater 34 to the temperature of about 150° C., which was maintained. When the temperature of the gas in the units and the connection pipes has reached the predetermined temperature and the expansion of the gas has been ceased, the outlet valve 94 was closed and the gas circulation was forcibly carried out under the operation of the gas circulation pump 16. The gas circulation was performed under the condition of the gas flow rate of 50,000 ml/min. for about 30 minutes, and the almost aroma component in the food material substantially was captured and recovered. After this process, the aroma capturing containers were removed, thus finishing the aroma capturing processes.

The captured aroma material, i.e., coffee flavor, obtained in accordance with the above Experimental Example 1 was compared with a coffee flavor obtained by the conventional method, by test making coffee jelly cake samples by adding the thus obtained coffee flavors to cake materials as shown in the following Table 1.

TABLE 1

| (recipe) | | | |
|---|---|---|---|
| | Sample A (this invention) | Sample B (comparative example) | Sample C (comparative example) |
| Granulated Sugar | 34 g | 34 g | 34 g |
| Gelatinizer | 2 g | 2 g | 2 g |
| Coffee Condensed Extract | 10 g | 10 g | — |
| Coffee Solution(*1) | — | — | 164 g |
| Coffee Flavor (this invention) | 0.1 ml | — | — |
| Coffee Flavor (prior art method) | — | 0.2 ml | — |
| Treating Liquid (Water) | 154 g | 154 g | — |
| Total (approximately) | 200 g | 200 g | 200 g |

(*1)Coffee Solution (usually drunk) of 200 ml extracted from coffee beans of 10 g (Brazil, Mocha, Colombia, Blue Mountain)

Sensory test was made with respect to the thus experimentally prepared cake samples in accordance with the Triangle Difference Test. Number (n) of panelers is 35 and the test result is shown in the following table 2 and 3.

The Triangle Difference Test referred to in this Table 1 means that the combinations of (A, A, B) and (A, B, B) of two kinds of samples A and B are prepared and the combined test materials are tasted by the same number of panelers. In such tasting tests, the sample B in the former combination and the sample A in the latter combination are selected by the panelers, and a difference between the samples A and B is discriminated as the corrected number of panelers. The difference is usually performed with reference to an assay table.

TABLE 2

| (Triangle Difference Test Result between A and B) | | | | | | | | |
|---|---|---|---|---|---|---|---|---|
| | | | Discrimination test | | Taste of correctors | | | |
| Combination | | n | Corrected No. | Assay | A | B | Assay | Result |
| Coffee Jelly (Brazil) | A,A,B | 35 | 25 | *** | 19 | 6 | *** | ⊙ |
| | A,B,B | 35 | 27 | *** | 21 | 6 | *** | ⊙ |
| | total | 70 | 52 | *** | 40 | 12 | *** | ⊙ |
| Coffee Jelly (Mocha) | A,A,B | 35 | 27 | *** | 20 | 7 | *** | ⊙ |
| | A,B,B | 35 | 26 | *** | 20 | 6 | *** | ⊙ |
| | total | 70 | 53 | *** | 40 | 13 | *** | ⊙ |
| Coffee Jelly (Colombia) | A,A,B | 35 | 25 | *** | 19 | 6 | *** | ⊙ |
| | A,B,B | 35 | 25 | *** | 20 | 5 | *** | ⊙ |
| | total | 70 | 50 | *** | 39 | 11 | *** | ⊙ |
| Coffee Jelly (Blue Mountain) | A,A,B | 35 | 27 | *** | 20 | 7 | *** | ⊙ |
| | A,B,B | 35 | 26 | *** | 21 | 5 | *** | ⊙ |
| | total | 70 | 53 | *** | 41 | 12 | *** | ⊙ |

⊙: Excellence was clearly discriminated.

With reference to the above Table 2, the evaluation of the test result was as follows.

With respect to the respective coffee jellies, in case of n=35 (panelers) with reference to the Triangle Difference Test, in case of the discrimination degree, that means degree of correct discrimination readable from the discrimination assay table, being above 22, 0.1% significance is denoted as * and in case of above 19, 1% significance is denoted as . In case of n=70 with reference to the Triangle Difference Test, in case of above 37, 0.1% significance is denoted as * and in case of above 34, 1% significance is denoted as . The meaning of 0.1% significance is that probability for mistaking two kinds of the test materials (level of significance) is 0.1%, and hence, 1% significance means that the level of significance is 1%.

Furthermore, in case of n=35 (panelers) who preferred the sample A within the panelers correctly discriminating the samples A and B, in case of the discrimination degree based on the Triangle Difference Test assay table being above 15, 0.1% significance is denoted as * and in case of above 13, 1% significance is denoted as . In case of n=70, in case of the discrimination degree based on the Triangle Difference Test assay table being above 22, 0.1% significance is denoted as * and in case of above 20, 1% significance is denoted as .

According to the result of Table 2, it was found that the samples A and B could be clearly discriminated and high evaluation was given to the sample A of the coffee flavor according to this invention.

TABLE 3

| (Result of Triangle Difference Test between A and C) | | | | | |
|---|---|---|---|---|---|
| | | | Discrimination test | | |
| Combination | | n | Corrected No. | Assay | Result |
| Coffee Jelly (Brazil) | A,A,C | 35 | 10 | — | ◯ |
| | A,C,C | 35 | 9 | — | ◯ |
| | total | 70 | 19 | — | ◯ |
| Coffee Jelly (Mocha) | A,A,C | 35 | 8 | — | ◯ |
| | A,C,C | 35 | 8 | — | ◯ |
| | total | 70 | 16 | — | ◯ |
| Coffee Jelly (Colombia) | A,A,C | 35 | 8 | — | ◯ |
| | A,C,C | 35 | 10 | — | ◯ |
| | total | 70 | 18 | — | ◯ |
| Coffee Jelly (Blue Mountain) | A,A,C | 35 | 8 | — | ◯ |
| | A,C,C | 35 | 9 | — | ◯ |
| | total | 70 | 17 | — | ◯ |

◯: Clear excellence was not discriminated.

As shown in Table 3, as the clear difference was not found out between the samples A and C, the preference test was not performed. That is, it was found that the sample A having the coffee flavor according to this invention has not significant difference from the sample C utilizing drip coffee solution.

EXPERIMENTAL EXAMPLE 2

In the utilization of the aroma capturing apparatus shown in FIG. 1, a food material of barley of 300 g subjected to the heat treatment such as roasting treatment was supplied in a column 30 having an inner volume of 1000 ml, which was then sealed. An aroma capaturing solution of 300 g consisting of mixed glycerol and ethanol having volume ratio of 1:1 was filled up in the aroma capturing containers 61, 62 and 63, each having an inner volume of 500 ml, and the containers were maintained at the cooled temperature of 8° to 15° C.

Under this condition, the inlet valve 14 and the outlet valve 94 were opened, and nitrogen gas contained in the nitrogen gas bomb was fed at a flow rate of 3000 ml/min. for about two minutes to substitute the gas in the apparatus with the nitrogen gas as a carrier gas. After the completion of the substitution, the inlet valve 14 was closed.

Next, the column 30 was heated by the heater 34 to a temperature of about 150° C., which was maintained. When the temperature of the gas in the units and the connection pipes has reached the predetermined temperature and the expansion of the gas has been ceased, the outlet valve 94 was closed and the gas circulation was forcibly carried out under the operation of the gas circulation pump 16. The gas circulation was performed under the condition of the gas flow rate of 50,000 ml/min. for about 30 minutes, and the almost aroma component in the food material substantially was captured and recovered. After this process, the aroma capturing containers were removed, thus finishing the aroma capturing processes.

The captured aroma material, i.e., barley tea flavor, obtained in accordance with the above Experimental Example 2 was compared with a barley flavor obtained by the conventional method, by test making drink samples by adding the thus obtained barley tea flavors to various drinks as shown in the following Table 4.

TABLE 4

|  | (Blended table) | | |
| --- | --- | --- | --- |
|  | Sample D (this invention) | Sample E (comparative example) | Sample F (comparative example) |
| Barley tea Condensed Extract Treating solution | 10 g 190 g | 10 g 190 g | — — |
| Barley tea Flavor (this invention) | 0.1 ml | — | — |
| Barley tea Flavor (prior art method) | — | 0.2 ml | — |
| Boiled Barley tea (*2) | — | — | 200 g |
| Total (approximately) | 200 g | 200 g | 200 g |

(*2): Barley tea prepared by boiling roast barley of 25 g with boiled water of 1000 ml.

The respective samples were subjected to retort sterilization treatment for 20 minutes at a temperature of 121° C. Sensory test was made with respect to the thus prepared test drink samples in accordance with the Triangle Difference Test. Number (n) of panelers is 50 and the test result is shown in the following Tables 5 and 6.

TABLE 5

(Triangle Difference Test result with respect to barley tea drink between D and E)

|  |  |  | Discrimination test | | Taste of correctors | | | Result |
| --- | --- | --- | --- | --- | --- | --- | --- | --- |
| Combination | | n | Corrected No. | Assay | D | E | Assay | |
| Barley tea drink | D,D,E | 50 | 39 | *** | 32 | 7 | *** | ⊚ |
|  | D,E,E | 50 | 40 | *** | 35 | 5 | *** | ⊚ |
|  | total | 100 | 79 | *** | 67 | 12 | *** | ⊚ |

⊚: Excellence was clearly discriminated.

With reference to the above Table 5, the evaluation of the test result was as follows.

With respect to the respective barley tea drinks, in case of n=50 (panelers), in case of the discrimination degree with reference to Triangle Difference Test assay table being above 28, 0.1% significance is denoted as * and in case of above 26, 1% significance is denoted as . In case of n=100, in case of the discrimination degree with reference to Triangle Difference Test assay table being above 49, 0.1% significance is denoted as * and in case of above 46, 1% significance is denoted as .

Furthermore, in case of n=50 (panelers) who were fond of the sample D within the panelers correctly discriminating the samples D and E, in case of the discrimination degree based on the Triangle Difference Test assay table being above 18, 0.1% significance is denoted as * and in case of being above 16, 1% significance is denoted as . In case of n=100, in case of the discrimination degree based on the Triangle Difference Test assay table being above 29, 0.1% significance is denoted as * and in case of being above 27, 1% significance is denoted as .

According to the result of Table 5, it was found that the samples D and E could be clearly discriminated and high evaluation was given to the sample D of the barley tea flavor according to this invention.

TABLE 6

(Triangle Difference Test result with respect to barley tea drink between D and F)

|  |  |  | Discrimination test | |  |
| --- | --- | --- | --- | --- | --- |
| Combination | | n | Corrected No. | Assay | Result |
| Barley tea drink | D,D,F | 50 | 12 | — | ◯ |
|  | D,F,F | 50 | 11 | — | ◯ |
|  | total | 100 | 23 | — | ◯ |

◯: Clear excellence was not discriminated.

As shown in Table 6, since clear difference was not discriminated between the samples D and F, the preference test was not performed. That is, the sample D of the barley tea flavor according to this invention had no significant difference from the sample F of the barley tea actually boiled by boiled water.

The aroma substances obtained according to this invention can be applied to foods such as candy, jelly, chocolate, gum, biscuit, and cake, cooled foods such as ice cream and ice candy, deserts such as jelly, custered pudding, barvarian cream, drinks, cosmetic, and other aroma agents.

What is claimed is:

1. An apparatus for capturing an aroma component generated from an aroma source, comprising:
    a heating unit in which the aroma source is accommodated and which heats the aroma source to thereby generate the aroma component;
    a gas supply unit operatively connected to the heating unit for supplying a carrier gas and delivering the aroma component generated in the heating unit together with the supply gas; and
    an aroma capture unit operative connected to the heating unit for capturing the aroma component.

2. An aroma capturing apparatus according to claim 1, wherein said heating unit is provided with a cylindrical container in which the aroma source is accommodated and a heating means for heating the aroma source to generate the aroma component, said gas supply unit includes a gas supply source supplying the carrier gas for carrying from the heating unit, and said aroma capture unit is provided with an aroma capturing container in which aroma component dissolving solution is stored.

3. An aroma capturing apparatus according to claim 2, wherein the heating unit, the gas supply unit and the aroma capture unit constitute a carrier gas circulation loop and a gas circulation means is incorporated in the carrier gas circulation loop.

4. An aroma capturing apparatus according to claim 2, wherein said gas supply unit includes a connection pipe means connecting the heating unit and the aroma capturing container, the connection pipe means having one end inserted into the aroma capturing container and having an expanded opening.

5. An aroma capturing apparatus according to claim 2, wherein the aroma component dissolving solution is any one of glycerol, propylene glycol, ethanol, methanol, glycerol fatty acid ester, hexane, acetone, vegetable oil, animal oil, water, sugar alcohol or saccharides solution, or solution of mixture of some of them.

6. An aroma capturing apparatus according to claim 2, wherein the aroma component dissolving solution is any one of glycerol, propylene glycol, ethanol, glycerol fatty acid ester, vegetable oil, water, sugar alcohol or saccharides solution, or solution of mixture of some of them.

* * * * *